May 18, 1965     S. GOLDFARB     3,184,608
PRECISION PHASE SENSITIVE DEMODULATOR
Filed Aug. 24, 1962     3 Sheets-Sheet 1

SAMUEL GOLDFARB
INVENTOR.

BY *S. A. Giarratana*
*George B. Oujevolk*
ATTORNEYS

SAMUEL GOLDFARB
*INVENTOR.*

BY S. A. Guarratana
George B. Oujevolk
ATTORNEYS

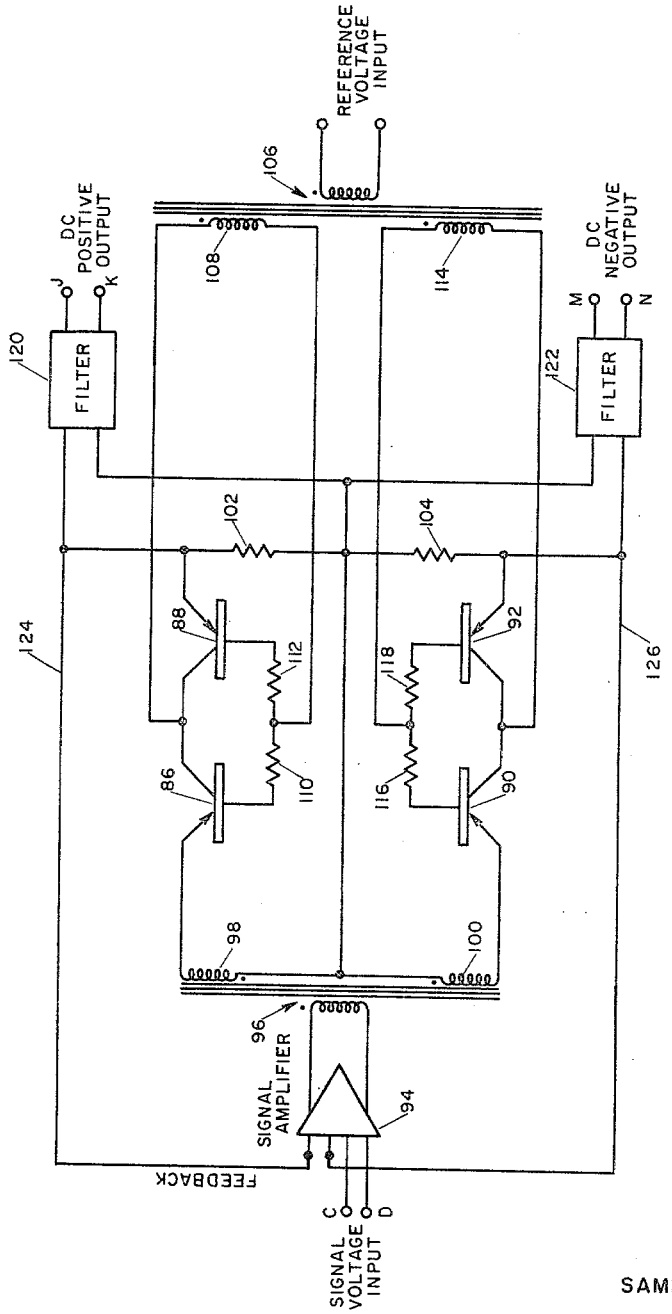

United States Patent Office 3,184,608
Patented May 18, 1965

3,184,608
PRECISION PHASE SENSITIVE DEMODULATOR
Samuel Goldfarb, Morristown, N.J., assignor to General Precision Inc., Little Falls, N.J., a corporation of Delaware
Filed Aug. 24, 1962, Ser. No. 219,184
5 Claims. (Cl. 307—88.5)

The present invention relates to phase sensitive demodulator circuits and more particularly to a completely electronic phase sensitive demodulator circuit of high precision and linearity.

There are many well known circuits for accomplishing phase sensitive demodulation, but the majority of these are only suited for servo work and other applications not requiring accurate voltage scaling. Precision demodulators have been made with improved accuracy but generally require a servo which introduces mechanical problems and limits the upper frequency of operation. Existing electronic circuits which do not introduce the aforementioned mechanical problems have limited accuracy because of inherent non-linearities in the rectifying devices which are essential to all demodulators.

It is one object of the present invention to provide a high precision electronic phase sensitive demodulator circuit having greatly improved linearity.

It is another object of the invention to provide an electronic phase sensitive demodulator circuit using negative feedback around the rectifying devices to reduce the non-linearities.

Other objects and features of novelty of the present invention will be specifically pointed out or will otherwise become apparent when referring, for a better understanding of the invention, to the following description taken in conjunction with the accompanying drawings, wherein:

FIG. 7 is a schematic diagram of a phase sensitive demodulator circuit embodying features of the present invention and employing transistors as the rectifying elements.

Figure 1:
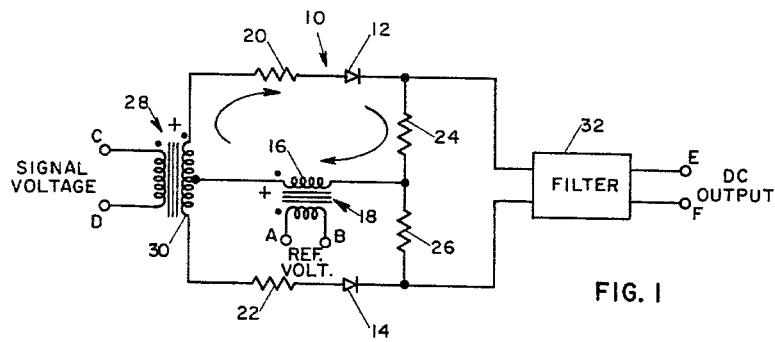
FIG. 1 is a schematic circuit diagram of one part of a half wave rectifying circuit used in a demodulator circuit embodying features of the present invention.
Figure 2:
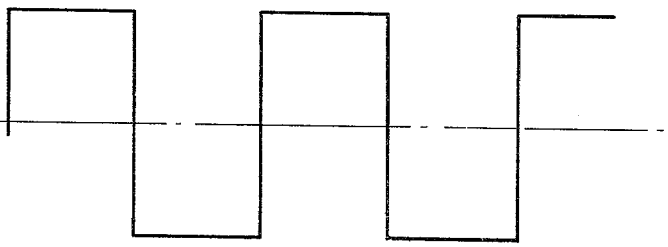
FIG. 2 illustrates the wave form of the reference voltage used in the circuit of FIG. 1.

Referring to FIG. 1, a half wave demodulator circuit 10 is shown which comprises a pair of diodes 12 and 14 connected in parallel with a secondary winding 16 of a transformer 18. Resistors 20 and 22 are connected in series with each of the diodes to minimize dissimilarities in the diodes, and load resistors 24 and 26 are also provided. A reference voltage having the rectangular wave form illustrated in FIG. 2 is applied to the terminals A and B of the primary winding of the transformer 18, and a signal voltage is applied to the terminal C and D of a transformer 28. The secondary winding 30 of the transformer 28 is connected in a circuit with the diodes 12 and 14 with the secondary winding 16 of the transformer 18 connected to a center tap on the secondary winding 30.

Figure 3:
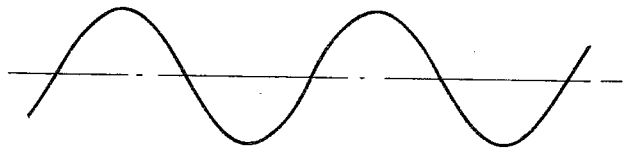
FIG. 3 illustrates the wave form of the signal voltage used in the circuit of FIG. 1.

For the purpose of this description the signal voltage is assumed to have the sinusoidal wave form illustrated in FIG. 3 which is 45° out of phase with respect to the phase reference voltage illustrated in FIG. 2. The amplitude of the signal is also lower than that of the reference voltage. A filter 32 is connected in the circuit as shown to provide a D.C. output at the terminals E and F which is equal to the average D.C. value of the signal voltage and is proportional to the product of the signal voltage amplitude and the cosine of the phase angle 45° between the signal voltage and the reference voltage.

During the positive half cycle of the reference voltage at terminal A, diodes 12 and 14 are forward biased and conduct. If during this half cycle, the signal voltage is of positive polarity at the terminal C, current will flow through the diode 12 and through the load resistor 24. This current is arbitrarily called positive load current. If during the same half cycle of reference voltage the signal voltage is negative, current will flow through the diode 14 and through the load resistor 26. The polarity of current through the load is now reversed or negative. It will be seen that with the opposite (negative) polarity half cycle of reference voltage, the diodes are reversed biased and cannot conduct.

Figure 4:
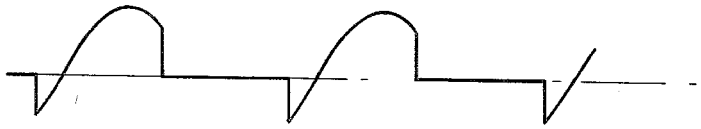
FIG. 4 illustrates the wave form of the output of the circuit of FIG. 1.

The output of the circuit 10 is a complex wave form as shown in FIG. 4 and as stated previously the average D.C. value of this complex signal is developed at the output terminals E and F of the filter 32. The circuit 10 requires careful construction to electrically balance the current paths, and the signal input transformer must have balanced winding capacities to ground and the diodes should have matched forward-volt-ampere characteristics. In spite of these precautions the circuit is not feasible for accuracies better than about 3%. From the wave form shown in FIG. 4, it is seen that comparison of this wave form to the signal input wave form is futile, and it is this fact which has heretofore prevented application of feedback techniques to improve the accuracy of this type of demodulator circuit.

Figure 6:
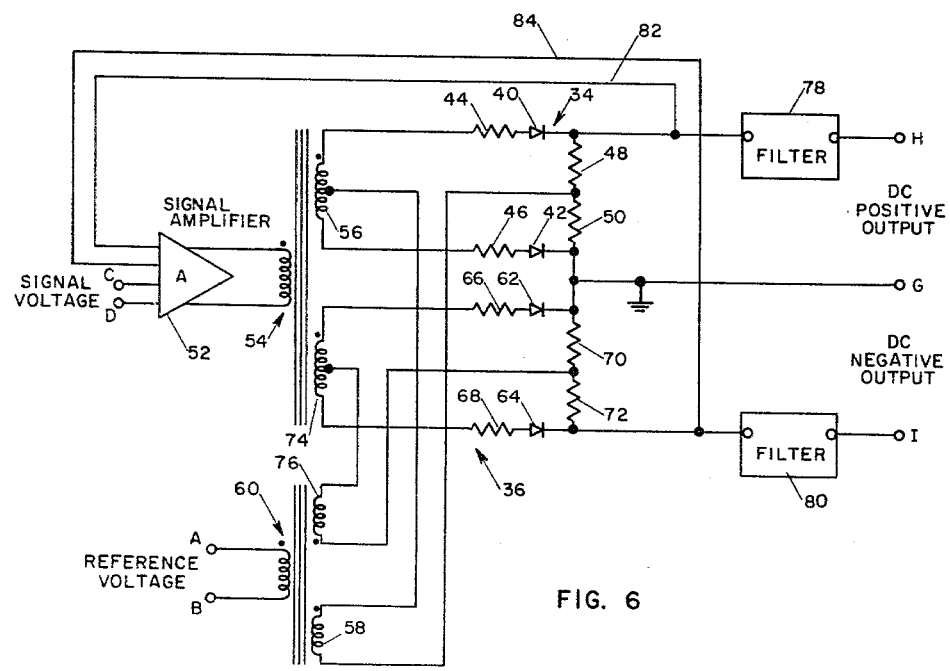
FIG. 6 is a schematic diagram of a phase sensitive demodulator circuit embodying features of the present invention and employing diodes as the rectifying elements.
Figure 5:
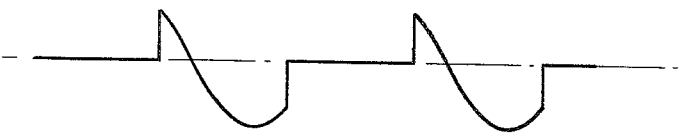
FIG. 5 illustrates a wave form similar to that of FIG. 4 with the reference voltage reversed.

In accordance with the present invention, a wave form as shown in FIG. 5 is obtained by reversing the phase of the reference voltage, and the sum of the wave forms of FIGS. 4 and 5 is therefore the original signal voltage wave form with the phase preserved. This sum is then used as a feedback signal to excellent advantage as shown in the circuit of FIG. 6. In this circuit, two identical half wave circuits 34 and 36 similar to the circuit 10 of FIG. 1 are employed. The half wave circuit 34 comprises a first set of diodes 40 and 42 having resistors 44 and 46 connected in series therewith to minimize dissimilarities in the diodes as previously described in connection wth FIG. 1. Load resistors 48 and 50 are provided as before and the signal voltage as delivered at terminals C and D of a signal amplifier 52 connected to the primary winding of a transformer 54. One secondary winding 56 of the transformer 54 is connected in the circuit with the diodes 40 and 42, and a secondary winding 58 of another transformer 60 is connected between a center tap on the secondary winding 56 and the point between the load resistors 48 and 50. A reference voltage having the wave form of FIG. 2 is applied at the terminals A and B of the primary winding of the transformer 60.

The half wave circuit 36 comprises a pair of diodes 62 and 64 with series connected resistors 66 and 68 and load resistors 70 and 72. The other secondary winding 74 of the transformer 54 is connected in the circuit with the diodes 62 and 64 and the other secondary winding 76 of the transformer 60 is connected between a center tap on the secondary winding 74 and a point between the load resistors 70 and 72. The juncture between the load resistors 50 and 70 is connected to ground as shown and one of the D.C. output terminals G is also connected to ground. Filters 78 and 80 are provided as shown to produce a D.C. positive output between the terminals H and G and a D.C. negative output between the terminals I and G, each of which outputs represent the average D.C. value of the signal in the half-wave circuits 34 and 36 as previously described. Lines 82 and 84 are connected between the filter inputs and the signal amplifier to transmit the sum of the wave forms of the half-wave circuits 34 and 36 at the filter inputs as negative feedback to the input of the signal amplifier 52.

In this manner the outputs of the two half-wave circuits 34 and 36 are combined to develop a signal which is applied as negative feedback so that non-linearities and unbalance in the demodulator are very effectively reduced in proportion to the amount of feedback.

As illustrated in FIG. 7, transistors 86–92 may be employed instead of diodes with the use of a combined output to provide negative feedback remaining substantially unchanged. The signal voltage is applied to terminals C and D of a signal amplifier 94 which is connected to a primary winding of a transformer 96. One end of one secondary winding 98 is connected to the emitter of the transistor 86 and the opposite end of the other secondary winding 100 is connected to the emitter of the transistor 90. The collectors of the transistors 86 and 90 are connected to the collectors of the transistors 88 and 92, respectively. The emitters of the transistors 88 and 92 are connected to opposite ends of load resistors 102 and 104 and the juncture between the load resistors is connected to the juncture between the adjacent ends of the secondary windings 98 and 100.

The reference voltage is applied to the terminals A and B of the primary winding of a transformer 106. One secondary winding 108 of the transformer is connected between the collectors of the transistors 86 and 88 and the juncture between resistors 110 and 112 connected to the bases of the transistors 86 and 88, respectively. The other secondary winding 114 of the transformer 106 is connected between the collectors of the transistors 90 and 92 and the juncture between resistors 116 and 118 connected to the bases of the transistors 90 and 92, respectively. A filter 120 is connected across the load resistor 102 to provide a positive D.C. output at terminals J and K, and a filter 122 is connected across the load resistor 104 to provide a negative D.C. output at terminals M and N just as the positive and negative D.C. outputs were provided at the terminals H, G and I in FIG. 6.

With this circuit the rectangular wave form of the reference voltage renders the transistors 86 and 88 conducting the first half of each cycle to transmit the signal voltage through the transistors 86 and 88 to the filter 120, and the transistors 90 and 92 are rendered conducting on the second half of each cycle of the reference voltage to transmit the signal voltage through the transistors 90 and 92 to the filter 122. Lines 124 and 126 connect the filter inputs to the signal amplifier 94 to transmit the sum of the wave forms at the filter inputs as a negative feedback to the signal amplifier as previously described in connection with FIG. 6.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A precision electronic phase-sensitive demodulator circuit comprising first and second half wave demodulator circuits, means for applying an A.C. signal voltage to each of said half wave circuits, means for applying an A.C. reference voltage to each of said half wave demodulator circuits having the same frequency as but a greater amplitude than said A.C. signal voltage, said reference voltage gating said first half wave demodulator circuit on the first half of each cycle thereof and gating said second half wave demodulator circuit on the second half of each cycle thereof, said first half wave demodulator circuit producing a first A.C. output signal having the first half of each cycle following the signal voltage and the second half of each cycle blocked out, said second half wave demodulator circuit producing a second A.C. output signal having the second half of each cycle following the signal voltage and the first half of each cycle blocked out, the sum of said first and second output signals being in phase with and having the same waveform as said signal voltage, and negative feedback means for feeding back the sum of said first and second output signals to said means for applying the signal voltage to reduce the effect of non-linearities in said first and second half wave demodulator circuits.

2. A precision electronic phase sensitive demodulator circuit comprising an input transformer having a primary and two secondary windings, a signal amplifier for energizing said primary winding in response to an A.C. signal voltage applied thereto, first and second diodes having corresponding electrodes thereof connected to opposite ends of one of the said secondary windings, first and second load resistors connected in series between the other corresponding electrodes of said diodes, reference voltage means connected between a center tap on said one secondary winding and a point between said two load resistors for introducing an A.C. reference voltage to the half wave phase sensitive demodulator circuit formed by said first and second diodes, third and fourth diodes having the corresponding electrodes thereof connected to opposite ends of the other of said secondary windings, third and fourth load resistors connected in series with the other corresponding electrodes of said third and fourth diodes, reference voltage means connected between a center tap on said other secondary winding and a point between said third and fourth resistors for introducing said A.C. reference voltage to the half wave phase sensitive demodulator circuit formed by said third and fourth diodes, the polarity of the reference voltage introduced to said second mentioned half wave circuit being reversed from the polarity of the reference voltage introduced to said first mentioned half wave circuit, one of said half wave circuits producing a first A.C. output signal having the first half of each cycle following said signal voltage and the second half of each cycle blocked out, the other of said half wave circuits producing a second A.C. output signal having the second half of each cycle following said signal voltage and the first half of each cycle blocked out, the sum of said output signals having the same waveform as and being in phase with said signal voltage, and negative feedback means for feeding back the sum of said output signals to said signal amplifier.

3. The invention as defined in claim 2, including filter means energized by said first and second output signals for producing positive and negative D.C. outputs equal to the average D.C. value of the first and second output signals, respectively.

4. A precision electronic phase-sensitive demodulator circuit comprising an input transformer having a primary and two secondary windings, a signal amplifier for energizing said primary winding in response to an A.C. signal voltage applied thereto, a first half wave demodulator circuit connected to opposite ends of one of said secondary windings, a second half wave demodulator circuit connected to opposite ends of the other of said secondary windings, each of said half wave circuits including a pair of transistors, means for applying an A.C. reference voltage signal across each pair of said transistors, said reference voltage gating one pair of said transistors on the first half of each cycle so that the signal voltage may pass therethrough to produce a first A.C. output signal and gating the other pair of said transistors on the second half of each cycle to produce a second A.C. output signal, the sum of said A.C. output signals having the same waveform as and being in phase with said signal voltage, and negative feedback means for feeding back the sum of said output signals to said signal amplifier.

5. The invention as defined in claim 4 including filter means energized by said first and second output signals for producing positive and negative D.C. outputs equal to the average D.C. value of the first and second output signals, respectively.

References Cited by the Examiner

UNITED STATES PATENTS

| | | | |
|---|---|---|---|
| 2,524,051 | 10/50 | Goertz | 329—166 X |
| 2,597,886 | 5/52 | McCoy | 328—133 |
| 2,703,380 | 3/55 | Fraser | 328—133 X |
| 2,722,605 | 11/55 | Mills et al. | 328—133 X |
| 2,774,038 | 12/56 | Stavis | 328—133 X |
| 3,016,491 | 1/62 | Morse | 328—133 |
| 3,064,200 | 11/62 | Brown | 328—163 |
| 3,137,822 | 6/64 | Anderson | 329—204 |

JOHN W. HUCKERT, *Primary Examiner.*

ARTHUR GAUSS, *Examiner.*